3,770,867
METHOD OF EXTRUDING SILICA COMPOSITIONS
George H. Criss, Bethel Park, Pa., assignor to Dresser Industries, Inc., Dallas, Tex.
No Drawing. Original application Mar. 18, 1970, Ser. No. 20,859, now abandoned. Divided and this application Nov. 19, 1971, Ser. No. 200,621
Int. Cl. B28b 3/20; C04b 25/00, 27/04
U.S. Cl. 264—294
3 Claims

ABSTRACT OF THE DISCLOSURE

An extrudable coarse silica composition comprising fused or vitreous silica, volatilized silica, and a plasticizing organic binder. A method for rendering coarse fused or vitreous silica extrudable comprising adding thereto volatilized silica and a plasticizing organic binder.

CROSS REFERENCES TO RELATED APPLICATIONS

This application is a division of U.S. Ser. No. 20,859, filed Mar. 18, 1970, now abandoned.

BACKGROUND OF THE INVENTION

Heretofore, silica such as vitreous silica has been difficult to extrudate into a self-sustaining shape without adding substantial amounts of an inorganic plasticizer and size grading the silica such that all of it is substantially —325 mesh. The addition of large amounts of inorganic plasticizers destroys the refractoriness of the silica and, therefore, defeats the purpose for which the silica is employed in the first place. The utilization of homogeneous, fine batches results in brick having poor thermal shock resistance. For maximum thermal shock resistance, the batches should contain considerable material above 28 mesh, which greatly increases the problems associated with extruding a shape.

Therefore, it is highly desirable to be able to render coarse fused or vitreous silica extrudable without adding large amounts of less refractory materials.

SUMMARY OF THE INVENTION

According to this invention it has been discovered that coarse vitreous or fused silica can be rendered readily extrudable by the addition thereto of volatilized silica and a plasticizing organic binder.

Silica compositions of this invention can be readily extruded into various shapes such as a tubular shape and these shapes used in applications which require highly refractory sheathing and the like. For example, the composition of this invention can be extruded into a tube and the tube used as a refractory insulation to protect wiring or other instrumentation which is to be exposed to elevated temperatures that would otherwise be deleterious to the wiring or instrumentation. Tubes may also be used as shrouds in the continuous casting of steel to protect molten metal passing from a ladle to the casting apparatus from oxidation.

Therefore, it is an object of this invention to provide a new and improved coarse silica composition which is extrudable. It is a particular object to provide a method for producing coarse fused or vitreous silica shapes by extrusion.

Other aspects, objects and advantages of the invention will be apparent to those skilled in the art from the disclosure and the appended claims.

DETAILED DESCRIPTION OF THE INVENTION

The silica to be rendered extrudable according to this invention can be any defense generally non-crystalline, of the types variously referred to as silica glass, fused silica or vitreous silica. The silica is employed in a size graded form which can vary widely but will generally be less than —3 mesh in maximum size, with a graduation to include finer sizes. The vitreous silica should be sized according to this invention such that at least 25 percent is +28 mesh and at least 45 percent is +65 mesh. The balance is —65 mesh with about 40 percent passing a 150 mesh screen. Subsequently, the extruded blanks may be repressed, thus reshaped, in a secondary runner-type press. Other suitable represses for this purpose may be any one of many types which apply pressure through various means of power application. They may be actuated by compressed air, hydraulics, steam, or by mechanical means.

There is added to the vitreous silica a plasticizing organic binder and volatilized silica, the combination of these two materials being added in amounts sufficient to render the fused or vitreous silica extrudable. These amounts will vary widely but will generally be from about 0.25 to about 3 weight percent for the organic binder and from about 1 to about 15 weight percent for the volatilized silica. The batches are then charged to an extruding apparatus and shapes, such as, tubes and the like are formed.

Volatilized silica is a conventional material that is commercially available and is generally known to be silica which has been deposited from a vapor phase. A typical silica of this type result from the reduction of silica to form a silicon alloy, such as, ferrosilicon. A similar silica fume can also be produced by reducing quartz with carbon or other suitable reducing agents, treating the vaporous products of the reduction with an oxygen-yielding gas, and condensing the silica in finely divided form. The vitreous or fused silica normally analyzes at least 90 percent $SiO_2$ with between 2 and 3 percent of total FeO, MgO and $Al_2O_3$.

Many different plasticizing organic binders may be employed such as alginates, wax, methyl cellulose, dextrose, polysaccharide gums, etc. A preferred binder is anhydroglucose polymer which contains water-soluble polysaccharide gum.

The fused or vitreous silica, volatilized silica and plasticizing binder may be dry mixed or liquid mixed with water to obtain a homogeneous mixture thereof. Mixing can be carried out at room temperature conditions, although somewhat elevated temperatures which are not deleterious to the binder or other materials in the mixture can be employed if desired.

After mixing, the batch is fed to the extruding apparatus and shapes are extruded in the conventional manner.

The extrudate can be heat treated in one or more steps at temperatures above room temperature and up to about 1900° F. for widely varying periods of time, generally at least about ½ hour, to dry and strengthen the extrudate. If desired, other additives which are substantially nondeleterious to the silicas or binder in the mixture and to the ultimate refractoriness of the mixture can be employed. For example, ball clay and/or bentonite can be added in very minor amounts to help give the extrudate physical strength after firing. Generally, from about 0.5 to about 1 weight percent of either ball clay and bentonite or a combination thereof can be employed.

The following examples are illustrative of the teachings of this invention.

EXAMPLE I

Mixes of vitreous silica, analyzing less than 1 percent total $Al_2O_3$, $TiO_2$, and $Fe_2O_3$ with the remainder substantially $SiO_2$, Wyoming bentonite, and the anhydroglucose polymer were prepared. One additional mix was prepared eliminating the volatilized silica.

The various constituents of each mix were blended so that the resulting mix had a screen analysis of about 30 percent +28 mesh, about 50 percent +65 mesh, with the remainder −65 mesh. About 45 percent of the −65 mesh material passed a 150 mesh screen. Each mix was tempered with 8 to 10 weight percent water with mixing and allowed to age at room temperatures for about 15 hours. Thereafter, additional water was added to bring the total water added to the mix up to 11 to 13.5 weight percent. Extrusion of each mix in a Chambers extruder was then attempted.

The final composition of the mixes is shown in Table I below. The percentage binder and water added are based upon the total weight of the refractory batch.

TABLE I

| Mix | Percent | | |
|---|---|---|---|
| | 1 | 2 | 3 |
| Vitreous silica | 92 | 95.5 | 99 |
| Volatilized silica | 7 | 3.5 | |
| Bentonite | 1 | 1 | 1 |
| Polymer | +0.5 | +0.5 | +0.5 |
| Water, added before and during extrusion | 11 | 12 | 13.5 |

The mixes 1 and 2 in the above table extruded very readily into 4¼ inch outside diameter by 2¼ inch inside diameter tubes 30 inches long.

Mix 3 of the above table which contained no volatilized silica, required a higher water content for extrusion. This, however, gave an unsatisfactory soft product which was unsuitable for final reshaping. Thus, it can be seen that the addition of volatilized silica reduced the tempering water requirement and that the combination of volatilized silica and polymer was necessary to obtain an acceptable extrudable mix.

EXAMPLE II

A number of tubes were extruded utilizing other plasticizing organic binders. The base mix was the same as mix 1 of Table I. The binders added were as follows: 1 percent Methocel HG (a hydroxypropyl methylcellulose); 3 percent dextrin (water soluble gum derived from starch); 1 percent Keltex (sodium alginate); 0.5 percent Keltex; 0.5 percent anhydroglucose polymer; 1 percent amber powder and 1.5 percent anhydroglucose polymer; 1 percent Keltex.

The batches were dry mixed, tempered with 8 to 12 percent water and aged 4 days to allow complete solution of the plasticizers. The extrudability of each mix was evaluated by extruding a 4″ diameter column in the Chambers auger machine. All mixes extruded well.

All chemical analyses set forth herein are on the basis of an oxide analysis in conformity with the general practice of reporting the chemical analyses of refractory materials. All percentages are by weight, and all mesh sizes, unless otherwise specified, are according to the standard Tyler series.

Reasonable variations and modifications are possible within the scope of this disclosure without departing from the spirit and scope of this invention.

Having thus described the invention in detail, and with sufficient particularity as to enable those skilled in the art to practice it, what is desired to have protected by Letters Patent is set forth in the appended claims.

I claim:

1. A method for forming silica shapes comprising size grading a fused or vitreous silica aggregate to minus 3 mesh to provide at least 25% plus 28 mesh and at least 45% plus 65 mesh with the balance minus 65 mesh, mixing the aggregate with about 1 to 15% finely divided volatilized silica, about 0.5 to 1% of bentonite and about 0.25 to 3% of a plasticizing organic binder to form a batch, tempering the batch with about 8 to 13.5% of tempering fluid to extrudable consistency, feeding the batch to an extrusion apparatus and recovering extruded shapes therefrom.

2. A method according to claim 1 in which the binder is anhydroglucose polymer.

3. A method according to claim 1 in which the extruded shapes are fed to a power press and are repressed.

References Cited

UNITED STATES PATENTS

| 3,144,345 | 8/1964 | McCreight et al. | 106—69 |
| 3,236,665 | 2/1966 | King | 106—69 |
| 3,463,650 | 8/1969 | McCreight et al. | 106—69 |

FOREIGN PATENTS

| 467,555 | 8/1950 | Canada | 106—69 |

Singer et al.: "Lubricants and Antisticking Agents in Industrial Ceramics," New York, 1963, pp. 155–157 and 743.

Kingery: "Ceramic Fabrication Processes, New York, 1958, pp. 55–59 and 107 and 108.

ALLAN LIEBERMAN, Primary Examiner

U.S. Cl. X.R.

106—69, 193 J, 204, 209, 272